United States Patent
Klic et al.

(10) Patent No.: US 9,632,911 B2
(45) Date of Patent: Apr. 25, 2017

(54) STACK TRACE CLUSTERING

(71) Applicant: Red Hat, Inc., Raleigh, NC (US)

(72) Inventors: Karel Klic, Oslavany (CZ); Miroslav Lichvar, Brno (CZ)

(73) Assignee: Red Hat, Inc., Raleigh, NC (US)

( * ) Notice: Subject to any disclaimer, the term of this patent is extended or adjusted under 35 U.S.C. 154(b) by 280 days.

(21) Appl. No.: 13/762,630

(22) Filed: Feb. 8, 2013

(65) Prior Publication Data

US 2014/0229770 A1 Aug. 14, 2014

(51) Int. Cl.
G06F 11/36 (2006.01)

(52) U.S. Cl.
CPC ........ G06F 11/3636 (2013.01); G06F 11/366 (2013.01)

(58) Field of Classification Search
None
See application file for complete search history.

(56) References Cited

U.S. PATENT DOCUMENTS

| | | | |
|---|---|---|---|
| 5,928,369 A * | 7/1999 | Keyser et al. | 714/47.3 |
| 6,895,366 B2 * | 5/2005 | Izuoka et al. | 702/185 |
| 7,610,514 B2 * | 10/2009 | Modani et al. | 714/38.1 |
| 8,316,353 B2 * | 11/2012 | Aoyama et al. | 717/124 |
| 8,336,033 B2 * | 12/2012 | Schmelter et al. | 717/131 |
| 8,578,213 B2 * | 11/2013 | Han et al. | 714/38.1 |
| 2003/0226134 A1 * | 12/2003 | Sethi et al. | 717/147 |
| 2007/0283338 A1 * | 12/2007 | Gupta et al. | 717/154 |
| 2008/0134205 A1 * | 6/2008 | Bansal | G06F 11/3612 719/315 |
| 2013/0081000 A1 * | 3/2013 | Robinson | G06F 11/3692 717/127 |

OTHER PUBLICATIONS

Dang et al, ReBucket: A Method for Clusterin Duplicate Crash Reports Based on Call Stack Similarity, Jun. 2, 2012, Microsoft paper presented at ICSE 2012.*
Yuan, Image-Based Character Recognition, Sep 26, 2012, U.S. Appl. No. 13/627,643 Specification and Drawing.*
Glerum, et al. , "Debugging in the (Very) Large: Ten Years of Implementation and Experience", Retrieved at >, SOSP, Oct. 11-14, 2009, Big Sky, Montana, USA, pp. 1-17.
Helmer,R., (Nov. 3, 2014). Signature Generation. Retrieved from https://github.com/mozilla/socorro/blob/master/docs/development/glossary/signaturegeneration.rst on Jun. 23, 2016, 2 pages.

* cited by examiner

*Primary Examiner* — Lewis A Bullock, Jr.
*Assistant Examiner* — Bruce S Ashley
(74) *Attorney, Agent, or Firm* — Lowenstein Sandler LLP

(57) ABSTRACT

A system and a method are disclosed for stack trace clustering. In one example, the method includes receiving a first stack trace and a second stack trace, normalizing, by a processing device, the first and second stack traces, determining a distance between the normalized first and second stack traces, and determining whether the normalized first and second stack traces are equivalent based on the determined distance.

17 Claims, 6 Drawing Sheets

STACK TRACE CLUSTERING

TECHNICAL FIELD

The present disclosure relates to a computer system, and more specifically to a method and system for stack trace clustering.

BACKGROUND

When an application program that contains one or more defects is distributed to application users, the defects might cause an unexpected termination during the execution of the program or process. Tools and procedures have been developed to assist computer administrators and application developers with the analysis of such an unexpected termination. The provided information usually includes a stack trace describing frames that represent the program stack. A stack trace is a report of the active frames at a certain point in time during the execution of a program. A stack trace can allow for the tracking of the sequence of nested functions or procedures that were called up to the point where the stack trace is generated. A frame is representation of a function or a procedure that can be mapped to a program source code. A program stack is a listing of programs, functions, or procedures that have been executed up until the unexpected termination of the program and are arranged in the form of a stack.

A single defect in the computer source code may cause the creation of different stack traces. The stack traces that may be caused by a singe defect often share a similar characteristic but they might also differ substantially. For example, the names of frames of one stack trace may not be present in another stack trace, yet may be caused by the same application defect. In another example, the same frames may be present in two different stack traces but may appear in different respective orders. In another implementation, a first stack trace may share certain specific frames with a second stack trace, but the first stack trace may have additional frames that are not present in the second stack trace.

There are multiple reasons why a single application defect can cause different stack traces. Such reasons may include, for example: 1) the diversity of the users' hardware, for example the stack trace may reflect the availability of certain unique instructions on the computer's main processor, the ordering of the sub-components of the instructions, and the availability of a specific hardware such as a graphical processing unit; 2) the stack trace may reflect the diversity of the users' application environment, for example, different versions of the operating system kernel, shared libraries, programs, application plug-ins, system configuration and settings, and user preferences may be installed on different computers; and 3) the stack trace may include information regarding the diversity of the users' input and the occurrence of other events (such as incoming data from the computer network, and the wake-up of a system timer) that triggers the program defect or happens before the unexpected termination occurs.

The differences in the stack traces may cause a substantial overhead in the application maintenance functions. For example, an application developer may receive several stack traces, wherein each stack trace may indicate an unexpected termination of an application program execution. The application developer may analyze each individual stack trace to help him or her to pinpoint the source code location to be corrected. When an application developer corrects a defect in the program, he or she then may move on to analyze the next stack trace. It may not be clear or apparent to the application developer that a stack trace may have been caused by the same application defect that the application developer had already corrected while attending to or while analyzing a previous stack trace. Consequently, the application developer may spend time to analyze a stack trace in order to correct an application defect that was already corrected. The expertise and effort that is required to recognize that two stack traces that appear to be different but are caused by the same application defect can be substantial.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Methods and systems for stack trace clustering are described. The present disclosure describes a method that recognizes that stack traces may appear to be different but may be caused by a single defect in a program source code. In one implementation, the stack traces can be normalized in a specific way to suppress differences that may be caused by, for example, the diversity of the different users' environments. A distance function such as an applied string theory algorithm can then be used to determine a similarity between two normalized stack traces. The distance function can further be used to determine clusters of similar stack traces. Each cluster of stack traces may represent the same defect in source code.

In the following description, numerous details are set forth. It will be apparent that the aspects of the present disclosure may be practiced without these specific details. In some instances, well-known structures and devices are shown in block diagram form, rather than in detail, in order to avoid obscuring the disclosure.

Figure 1A:
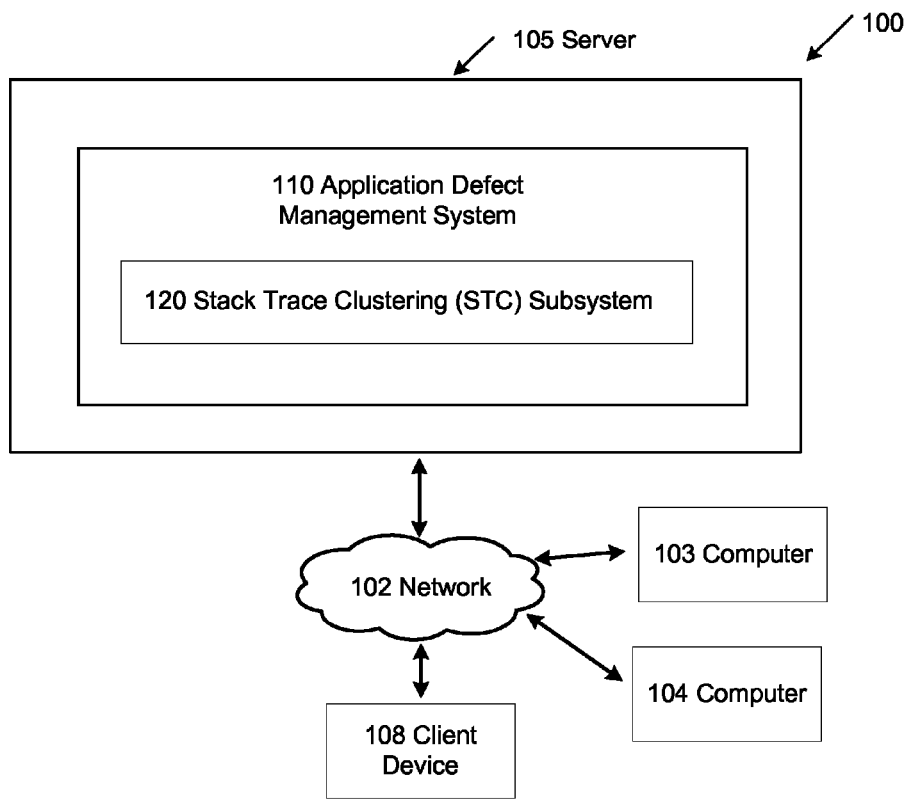
FIG. 1A depicts a block diagram illustrating an example network architecture in which implementations of the present disclosure can operate.

FIG. 1A depicts a block diagram of a network architecture 100 in which examples of the present disclosure may operate. The network architecture 100 may include a server 105, a network 102, computers 103 and 104, and a client device 108. The computers 103, 104 and the server 105 may each be a computer system to run services that serves the needs of users or other computers on the network 102. An example computer system is described in greater detail below in conjunction with FIG. 6.

The server 105 includes an Application Defect Management System (ADMS) 110 for receiving and processing stack traces created by applications executing on computers 103, 104 or server 105. In particular, the ADMS 110 allows an application developer to effectively keep track of outstanding application defects of applications executing on computers 103, 104 or server 105. The ADMS 110 can track application defects and their associated stack traces, and communicate similarities among the stack traces to the application developer. The ADMS 110 can operate automatically, without any user interaction or involvement.

The client device 108 may be any device capable of communicating with the server 105 via the network 102 including, but not limited to, a computer, a smart phone, a wireless device, a tablet, and/or any suitable computing device. In an example, the client device 108 may be a mobile device (e.g., a handheld device, smart phone or web portal device) that communicates with the network 102 via a wireless connection. In an example, the server 105 may determine and verify an electronic address (e.g., email address, IP address, etc.) associated with the client device 108 used by an application developer. It is also noted that the term "application developer" is used herein to refer to a person who uses the STC subsystem 120 and may also be considered as a reliable source of technique or skill for diagnosing and correcting defects in the source code.

The network 102 may be any type of communications medium that allows for the computers 103 and 104 and the client device 108 to communicate with the server 105. The network 102 may be, for example, a private network (e.g., a local area network (LAN), a wide area network (WAN), intranet, etc.), a corporate network (e.g., a private network for an organization such as a corporation), and/or a public network (e.g., the Internet). For example, the application developer may use the client device 108 to communicate with the server 105 via the network 102. In some implementations, the ADMS 110 may execute on the client device 108 to process stack traces created by applications executing on the client device 108 and track defects of the applications executing on the client device 108. The ADMS 110 can track application defects and their associated stack traces, and communicate similarities among the stack traces to the application developer.

Figure 1B:
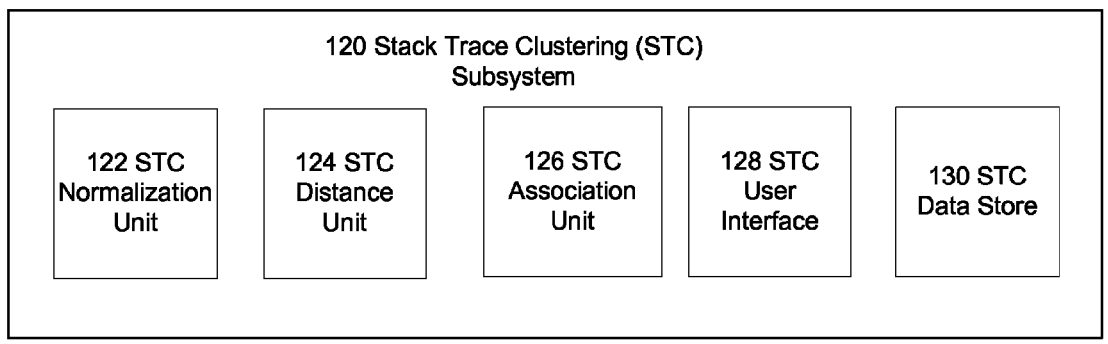
FIG. 1B illustrates a block diagram of an example stack trace clustering subsystem in accordance with the present disclosure.

FIG. 1B illustrates a block diagram of one implementation of the stack trace clustering (STC) subsystem 120. The STC subsystem 120 may include an STC normalization unit 122, an STC distance unit 124, an STC association unit 126, an STC user interface 128, and an STC data store 130.

The STC user interface 128 may be responsible for receiving stack traces from, for example, computers 103 and 104, and for interacting with an application developer via the client device 108. The STC user interface 128 may also receive stack traces from other computers. The STC data store 130 may be responsible for storing stack traces, normalized stack traces, and databases (discussed below) that may be used by the STC subsystem 120.

A stack trace may be generated when an application that is executed on, for example computer 103, terminates unexpectedly as a result of an error or a bug in the source code. The STC normalization unit 122 may replace the unique function name or process name in the received stack trace with a generic function or process name. The STC normalization unit 122 may also remove superfluous names and text from the received stack trace.

For example, a stack trace may include a function or process that copies a memory block. The generic name for this process may be "memcpy." However, when the memcpy function is executed on computer 103 (assume that computer 103 uses the SSE2 instruction set), then the stack trace from computer 103 may list the process as "memcpy_sse2." Similarly, when the memcpy function is executed on computer 104 (assume that computer 104 uses the SSE4.2 instruction set), then the stack trace from computer 104 may list the process as "memcpy_sse42." In this example, the STC normalization unit 122 may replace each of the respective stack trace entries of "memcpy_sse2" (from computer 103) and "memcpy_sse42" (from computer 104) with the generic name of "memcpy." In an example, the STC normalization unit 122 may access a mapping database that includes generic names for functions or programs, and may compare the generic name with the unique function name from the stack trace. The STC normalization unit 122 may use the mapping database to determine that the unique function name is equivalent to the generic name, and replace the unique function name with the generic name.

The STC normalization unit 122 may also be responsible for removing superfluous names that may commonly be present in stack traces but do not contribute to the value of the stack trace for the application developer. A few examples of superfluous names may include, but are not limited to, "start_thread", "clone", "std::terminate", "_XReply", and so on. The STC normalization unit 122 may access a database that includes a list of superfluous or meaningless names to determine that the name in the stack trace is superfluous, and may remove such superfluous names from the stack trace.

The STC normalization unit 122 may also be responsible for normalizing the stack trace length to include the generic name of the process or function that experiences an unexpected termination and a predetermined number of generic process names that immediately precede the process that experiences the unexpected termination. In other words, the most significant function in a stack trace can be the function that experienced the unexpected termination, followed by the functions that immediately precede the unexpectedly terminated function. As such, the STC normalization unit 122 may limit the number of generic process names to include the process or function that had unexpectedly terminated and the functions that immediately precedes the function that had unexpectedly terminated, in reverse chronological order. In one example, the length of the normalized stack trace may be limited to include 5 function names or less.

The STC normalization unit 122 may also be responsible for recognizing a certain distinguished function name or a certain combination of function names in a stack trace. For example, a distinguished function name or a combination of function names may be valuable in a stack trace such that, with respect to the application developer, all other preceding functions may be rendered superfluous or meaningless. The STC normalization unit 122 may access a database that includes such a distinguished function name or combination of function names, and upon the recognition of such name or combination in the stack trace, the function names that precede that distinguished function name or combination of function names can be removed from the stack trace.

The STC normalization unit 122 may also be responsible for recognizing and processing "??" frames. For example, a "??" frame may occur when the stack trace indicates that a process or a function was executed but the name of that process or function is unknown because of, for instance, a technical glitch. In an example, the STC normalization unit 122 may decide whether a "??" frame in a first stack trace is equivalent to an identified function name or a frame that is in the same position of a second stack trace. If the neighbor frames of the "??" frame in the first stack trace are equivalent to the neighbor frames of an identified frame in the second stack trace, then the STC normalization unit 122 may replace the "??" with the identified function name from the second stack trace. If both the first and second stack traces include "??" frames and their respective neighbor frames are equivalent, then the STC normalization unit 122 may refer to a database to identify a combination of frame names that includes the neighbor frames. If the STC normalization unit 122 locates such a combination, then the STC normalization unit 122 may replace both "??" frames with the function name from the database.

In FIG. 1B, the STC distance unit 124 may be responsible for defining a distance between two stack frames. In one example, the stack traces are normalized and the "??" frames are processed before computing the distance between them. The STC distance unit 124 may define a distance between the normalized stack traces using an applied string theory algorithm such as, for example, the Levenshtein distance or the Damerau-Levenshtein distance. Generally, the Levenshtein distance between two strings is considered to be the minimum number of edits needed to transform one string into the other, with the allowable edit operations being insertion, deletion, or substitution of a single character. The Damerau-Levenshtein distance between two strings is considered to be the minimum number of edits needed to transform one string into the other, with the allowable edit operations being insertion, deletion, or substitution of a single character, or a transposition of two adjacent characters.

As discussed above, the length of each normalized stack trace may be limited to a certain number of frames, for example, 5 frames. In an example, the STC distance unit 124 may be responsible for defining a distance between two normalized stack traces. If the two normalized stack traces have the same frames in the same order, then the STC distance unit 124 may consider that these two stack traces may be functionally identical, meaning that there may be a near certainty or a high degree of confidence that each of their respective stack traces were produced by the same application defect. On the other hand, in another example, if the two normalized stack traces include different generic function names, then the STC distance unit 124 may consider with a high degree of confidence that each of their respective stack traces were produced by different application defects. In another example, if each of the normalized stack traces contain identical functions but appear in a different order, then the STC distance unit 124 may determine that each of the respective stack traces were produced by the same application defect, within a certain probability or a confidence level.

In FIG. 1B, the STC association unit 126 may be responsible for computing and determining clusters of stack traces, wherein each stack trace in the cluster may be estimated to have been produced by the same application bug or defect. To accomplish this in an efficient and expedient manner, the STC association unit 126 may use two phases to determine the stack trace clusters.

In an example, for the first clustering phase the STC association unit 126 may split the received stack traces into groups of limited size. The limited size of the number of stack traces in each group may improve the efficiencies for processing a large number of stack traces in a minimum amount of time.

In the first clustering phase, the STC association unit 126 may sort the stack traces in the group by the frequency of the function names in the stack traces. The STC association unit 126 may then create a cluster for every stack trace. The stack trace clusters are gradually merged based on the distance between the normalized stack traces. The merging of clusters may continue until all clusters that can be merged have been merged. In another example, the merging of clusters may continue until a predetermined maximum size of the cluster is reached. In other words, x input clusters may be transformed or merged into y resulting clusters, where $1<=y<=x$.

In the second clustering phase, the STC association unit 126 may use the stack trace distance function to arrange and store the clustering results in a dendrogram or a hierarchical directory information tree structure to allow for quick adjustments in the results based on changing the required distance or changing the probability or confidence level.

Figure 2:
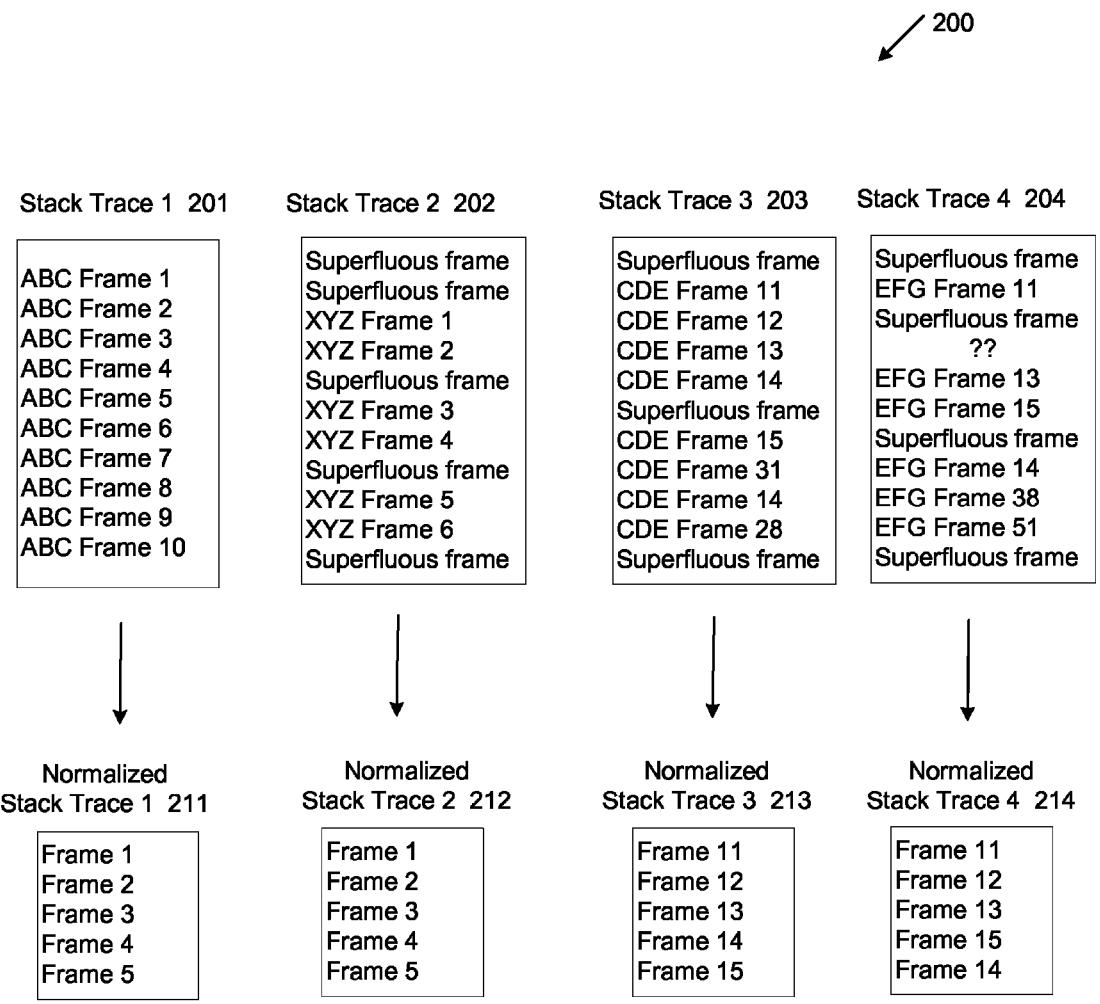
FIG. 2 depicts examples of stack traces and their respective normalized stack traces used for stack trace clustering in accordance with some implementations of the present disclosure.

FIG. 2 depicts examples of stack traces and their respective normalized stack traces that may be used for stack trace clustering. For example, the STC subsystem 120 as shown in FIG. 1A may receive stack trace 1 201, stack trace 2 202, stack trace 3 203, and stack trace 4 204, from computer 103, computer 104, or from other computers that are not shown in FIG. 1A. In this hypothetical example, the frame name at the top of each respective stack trace may represent the function or process that was being executed during the unexpected termination. The remaining frame names appear in reverse chronological order of program execution, from most recent to least recent (from top to bottom).

Looking closely at stack trace 1 201 and stack trace 2 202, it may first appear that these two stack traces are different, which may lead one to conclude that stack trace 1 201 and stack trace 2 202 were caused by different application defects. For example, the names of the frames are completely different, e.g., in stack trace 1 201, the frame names are "ABC Frame 1 ", "ABC Frame 2" and so on, while in stack trace 2 202, the frame names are "XYZ Frame 1 ", "XYZ Frame 2 " etc. Also, stack trace 1 201 lists 10 frame names while stack trace 2 202 lists only 6 frame names. Furthermore, stack trace 2 202 includes 5 lines of text that do not appear in stack trace 1 201.

The STC normalization unit 122 may normalize stack trace 1 201 and stack trace 2 202 to produce normalized stack trace 1 211 and normalized stack trace 2 212, respectively. As discussed above, the STC normalization unit 122 may be responsible for removing the superfluous frames from stack trace 2 202, for replacing unique frame names with generic frame names, and for limiting the number of frames in the normalized stack trace. In this example, the STC normalization unit 122 may limit the number of frames to 5 frames.

The STC distance unit 124 may process the normalized stack trace 1 211 and normalized stack trace 2 212 and determine that stack trace 1 201 and stack trace 2 202 were generated by the same application defect. Since the normalized stack trace 1 211 and normalized stack trace 2 212 are identical, the STC distance unit 124 may determine that the respective stack trace 1 201 and stack trace 2 202 were caused by the same defect with near certainty or with a high degree of confidence or probability. Accordingly, the STC association unit 126 may merge stack trace 1 201 and stack trace 2 202 so that they are part of the same cluster, based on the determination by the STC distance unit 124.

Similarly, looking closely at stack trace 3 203 and stack trace 4 204, it can readily be seen that stack trace 4 204 does not include Frame 12, whereas Frame 12 is included in stack trace 3 203. As discussed above, a "??" frame indicates that the name of the frame is unknown. Since the neighbors of Frame 12 from stack trace 3 203 and the neighbor of the "??" frame from stack trace 4 204 are equivalent, the STC normalization unit 122 may replace the "??" with "Frame 12". Therefore, "Frame 12" appears in the normalized stack trace 4 214 even though it does not appear in stack trace 4 204.

It is noted that the frame order for normalized stack trace 3 203 is different from that of stack trace 4 204. For example, in stack trace 3 203, Frame 14 occurs after Frame 15, whereas in stack trace 4 204, Frame 15 occurs after Frame 14. Even though the order of occurrence of the frames in the respective normalized stack frames may not be identical, the STC distance unit 124 may still determine with high probability, though perhaps not near certainty, that stack trace 3 203 and stack trace 4 204 were caused by the same defect. Accordingly, the STC association unit 126 may merge stack trace 3 203 and stack trace 4 204 so that they are part of the same cluster, based on the determination by the STC distance unit 124.

It should be noted that the generic frame names in the normalized stack trace 3 213 are different from the generic frame names in the normalized stack trace 1 211. As such, the STC distance unit 124 may determine that the respective stack trace 1 201 and stack trace 3 203 were not caused by the same defect with near certainty or a high degree of confidence or probability. Accordingly, the STC association unit 126 may not merge stack trace 1 201 and stack trace 3 203. Instead, the STC association unit 126 may assign stack trace 1 201 and stack trace 3 203 to different clusters, based on the determination by the STC distance unit 124.

Figure 3:
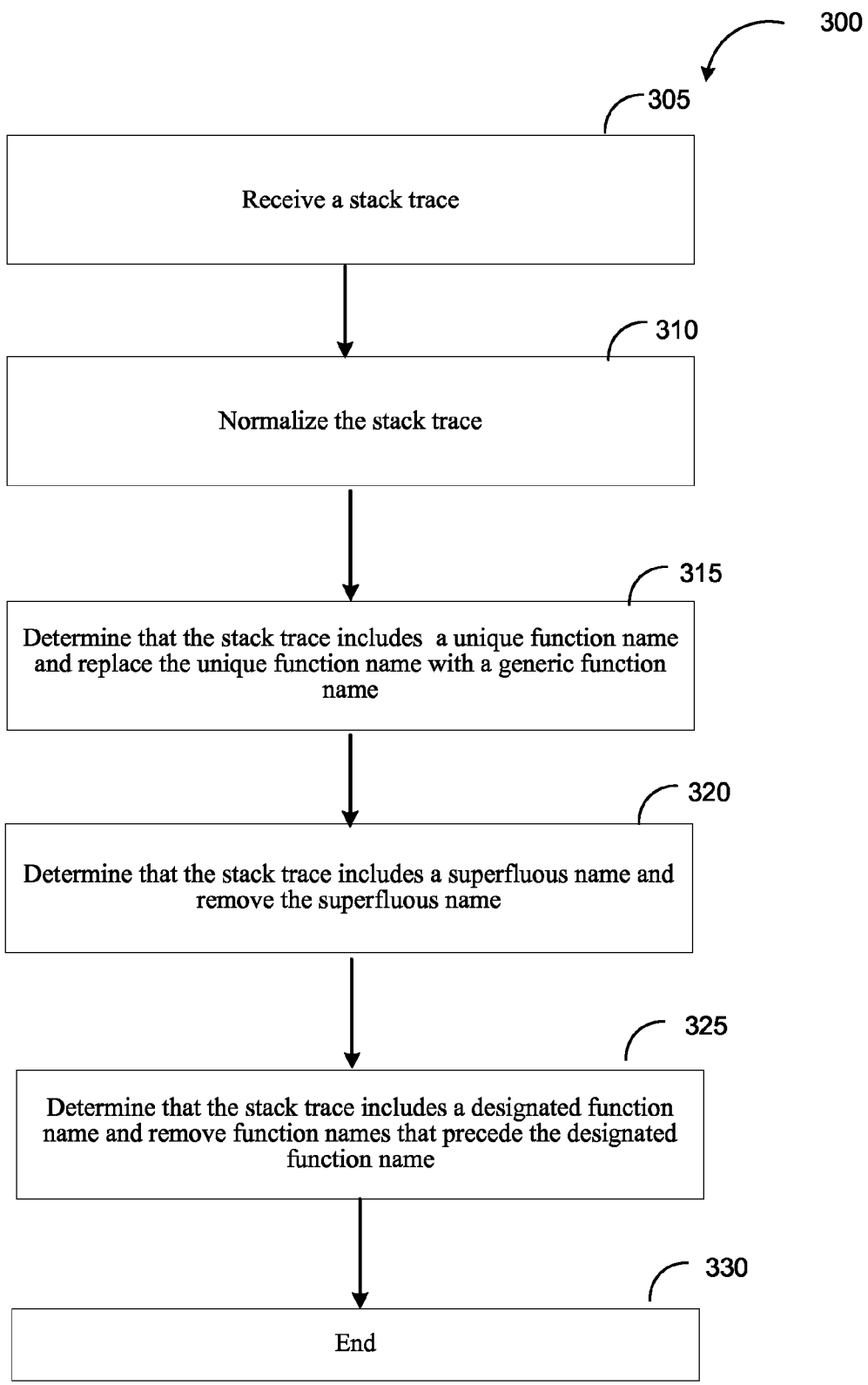
FIG. 3 shows a flow diagram illustrating an example of a method for normalizing stack traces in accordance with some implementations of the present disclosure.

FIG. 3 depicts a flow diagram of aspects of an example method 300 for normalizing stack traces. The method 300 may be performed by computer processing logic that may include hardware (e.g., circuitry, dedicated logic, programmable logic, microcode, etc.), application (e.g., instructions run on a processing device to perform hardware simulation), or a combination thereof. In one example, the method 300 may be performed by the STC subsystem 120 of FIG. 1A.

For simplicity of explanation, methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Referring to FIG. 3, the method begins at block 305, where the STC subsystem 120 receives a stack trace (e.g., the stack trace 1 201, stack trace 2 202, stack trace 3 203 or stack trace 4 204 of FIG. 2) associated with an application that may have been terminated unexpectedly due to an application defect. At block 310, the STC subsystem 120 normalizes the stack trace. At block 315, the STC subsystem 120 may determine that the stack trace includes a unique function name, for example, "memcpy_sse2", as discussed above. The STC subsystem 120 may determine that the unique function name is equivalent to a generic function name, for example, "memcpy", also as discussed above, and replace the unique function name with the generic function name.

At block 320, the STC subsystem 120 may determine that the stack trace includes a superfluous name, e.g., "start_thread", and may remove the superfluous name from the stack trace. At block 325, the STC subsystem 120 may determine that the stack trace includes a distinguished function name and remove function names that precede the distinguished function name. At block 330, the method 300 ends.

Figure 4:
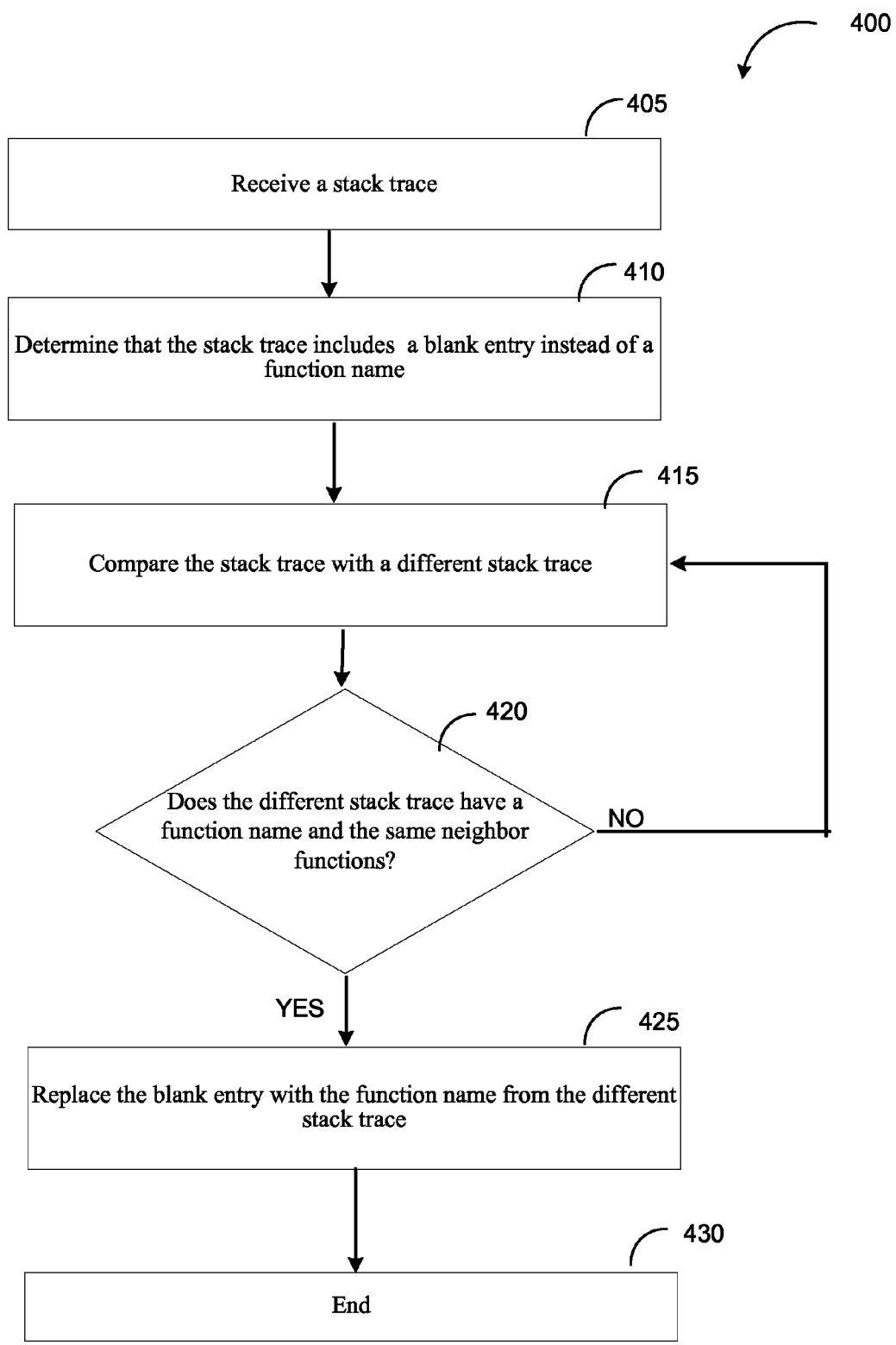
FIG. 4 illustrates a flow diagram illustrating an example of a method for processing a blank entry in a stack trace in accordance with some implementations of the present disclosure.

FIG. 4 depicts a flow diagram of aspects of an example method 400 for processing a blank entry in a stack trace. The method 400 may be performed by computer processing logic that may include hardware (e.g., circuitry, dedicated logic, programmable logic, microcode, etc.), application (e.g., instructions run on a processing device to perform hardware simulation), or a combination thereof. In one example, the method 400 may be performed by the STC subsystem 120 of FIG. 1A.

Referring to FIG. 4, the method begins at block 405, where the STC subsystem 120 receives a stack trace (e.g, the stack trace 1 201, stack trace 2 202, stack trace 3 203 or stack trace 4 204 of FIG. 2) associated with an application that application had unexpectedly terminated due to an application defect. At block 410, the STC subsystem 120 determines that the stack trace includes a blank entry (e.g., the "??" frame as discussed above) instead of a function name. At block 415, the STC subsystem 120 may compare the stack trace with a different stack trace. At block 420, the STC subsystem 120 may determine whether the blank entry in a received stack trace is equivalent to a frame of the different stack trace. The STC subsystem 120 may determine if the neighbor frames of the blank entry are equivalent to the neighbor frames of a frame in the different stack trace. If the neighbor frames are equivalent, then at block 425, the STC subsystem 120 may replace the blank entry with the equivalent frame name from the different stack trace and the method 400 ends at block 430.

At block 420, if the different stack frame does not have equivalent neighbor frames, then the STC subsystem 120 may repeat the process at block 415 by selecting a different stack trace in another attempt to replace the blank entry with an equivalent function name. In an example, the STC subsystem 120 may include a counter (not shown) so that only a certain number of attempts may be made to replace the blank entry with an equivalent function name. This counter prevents an occurrence of an infinite loop, thereby ending the method 400 after a predetermined number of attempts have been made.

Figure 5:
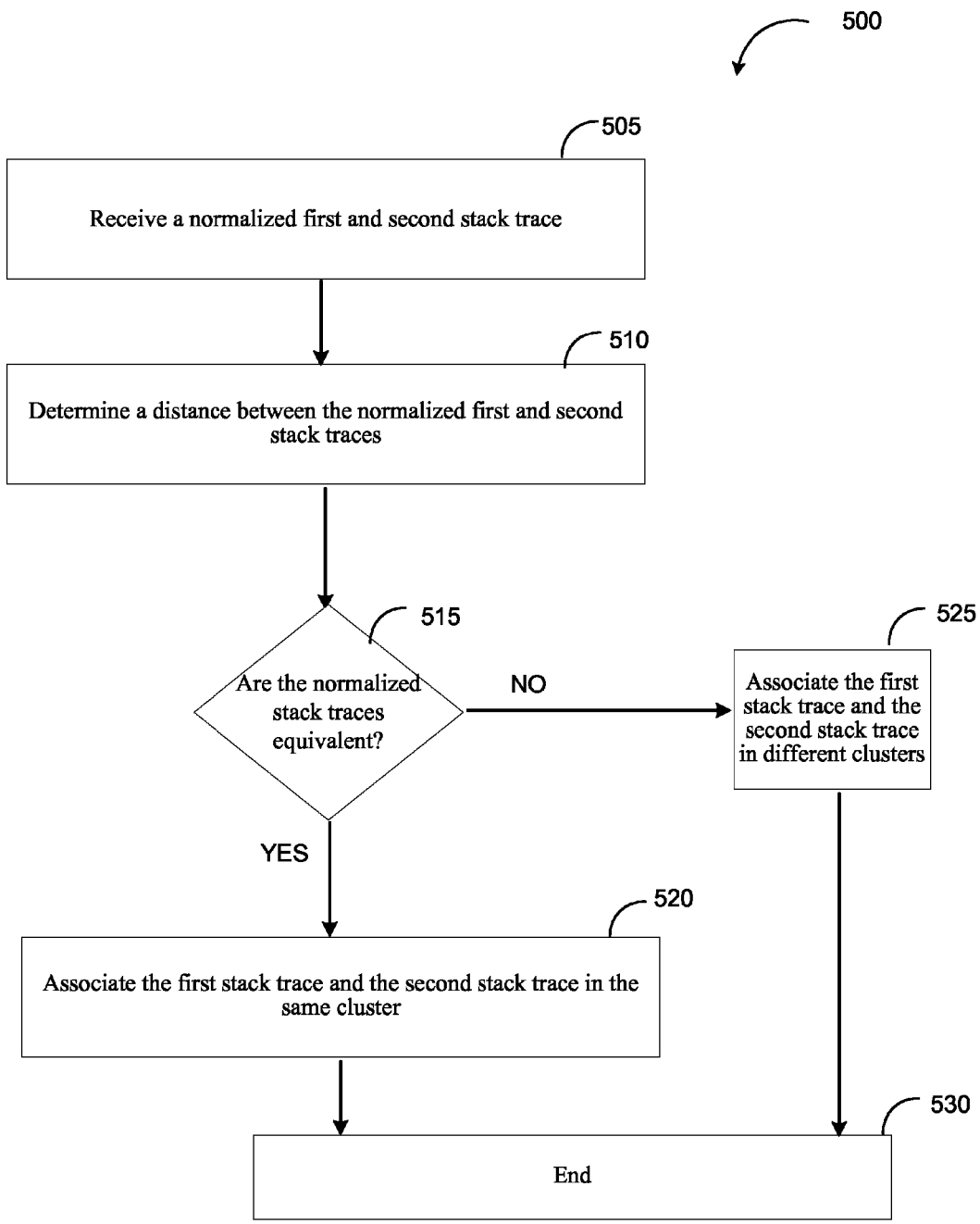
FIG. 5 shows a flow diagram illustrating an example of a method for clustering stack traces in accordance with some implementations of the present disclosure.

FIG. 5 depicts a flow diagram of aspects of an example method 500 for clustering stack traces. The method 500 may be performed by computer processing logic that may include hardware (e.g., circuitry, dedicated logic, programmable logic, microcode, etc.), application (e.g., instructions run on a processing device to perform hardware simulation), or a combination thereof. In one example, the method 400 may be performed by the STC subsystem 120 of FIG. 1A.

Referring to FIG. 5, the method begins at block 505, where the STC subsystem 120 receives a normalized first and second stack trace (e.g., the normalized stack trace 1 211, normalized stack trace 2 212, normalized stack trace 3 213 or normalized stack trace 4 214 of FIG. 2) from the STC normalization unit 122. At block 510, the STC subsystem 120 may use an applied string theory algorithm as discussed above to determine a distance between the normalized first and second stack traces. At block 515, the STC subsystem 120 determines whether the normalized first and second stack traces are equivalent, based on the determined distance. If the normalized first and second stack traces are equivalent, then at block 520, the STC subsystem 120 may associate the first stack trace and the second stack trace with the same cluster, and the method 500 ends at block 530. At block 515, if the normalized first and second stack traces are not equivalent, then at block 525, the STC subsystem 120 may associate the first stack trace and the second stack trace with different clusters, and the method 500 ends at block 530.

Figure 6:
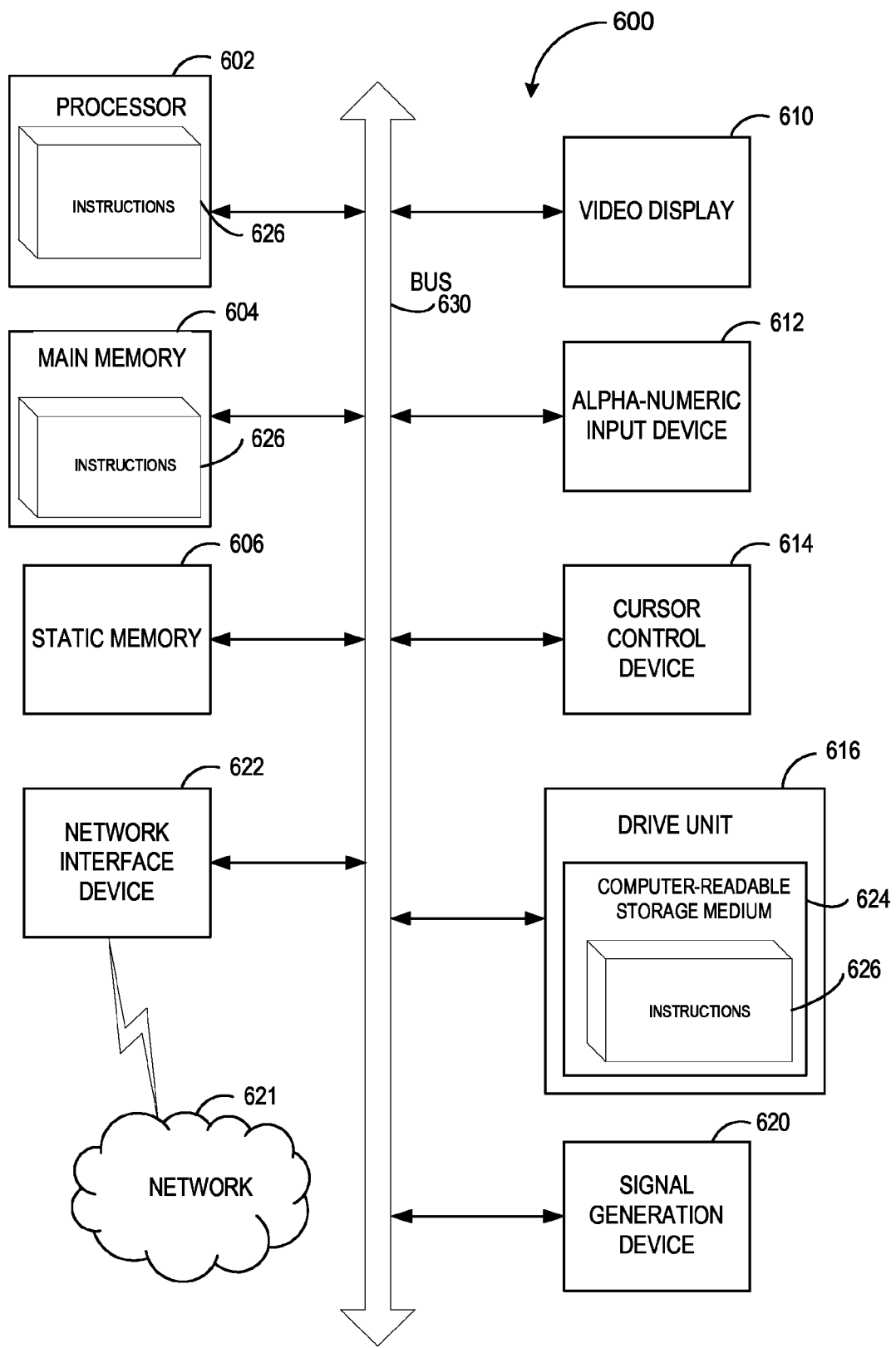
FIG. 6 depicts a diagrammatic representation of a machine in the form of a computer system, in accordance with one example.

FIG. 6 illustrates a diagrammatic representation of a machine in the form of a computer system 600 within which a set of memory instructions 626, for causing the machine to perform any one or more of the methodologies discussed herein, may be executed. In alternative example, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The computer system 600 includes a processor 602, a main memory 604 (e.g., read-only memory (ROM), flash memory, dynamic random access memory (DRAM) such as synchronous DRAM (SDRAM), etc.), a static memory 606 (e.g., flash memory, static random access memory (SRAM), etc.), and a secondary memory 616 (e.g., a data storage device), which communicate with each other via a bus 630.

The processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processor 602 may also be one or more special-purpose processing devices such as an application specific integrated circuit (ASIC), a field programmable gate array (FPGA), a digital signal processor (DSP), network processor, or the like. The processor 602 is configured to execute the STC subsystem 120 for performing the operations and steps discussed herein.

The computer system 600 may further include a network interface device 622. The network interface device may be in communication with a network 621. The computer system 600 also may include a video display unit 610 (e.g., a liquid crystal display (LCD), a touch screen, or a cathode ray tube (CRT)), an alphanumeric input device 612 (e.g., a keyboard), a cursor control device 614 (e.g., a mouse), and a signal generation device 620 (e.g., a speaker).

The secondary memory 616 may include a computer-readable storage medium 624 on which is stored one or more sets of instructions 626 (e.g., instructions executed by the STC subsystem 120) for the computer data processing system 100 embodying any one or more of the methodologies or functions described herein. The instructions 626 for the computer data processing system 100 may also reside, completely or at least partially, within the main memory 604 and/or within the processing device 602 during execution thereof by the computer system 600, the main memory 604 and the processing device 602 also constituting computer-readable storage media. The instructions 626 for the computer data processing system 100 may further be transmitted or received over a network via the network interface device 622.

While the computer-readable storage medium 624 is shown in an example to be a single medium, the term "computer-readable storage medium" should be taken to include a single medium or multiple media (e.g., a centralized or distributed database, and/or associated caches and servers) that store the one or more sets of instructions 626. The term "computer-readable storage medium" shall also be taken to include any medium that is capable of storing or encoding a set of instructions for execution by the machine that cause the machine to perform any one or more of the methodologies of the disclosure. The term "computer-readable storage medium" shall accordingly be taken to include, but not be limited to, solid-state memories, and optical and magnetic media.

Some portions of the detailed descriptions above are presented in terms of symbolic representations of operations on data bits within a computer memory. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "executing," "monitoring," "determining," "adjusting," "sending," "receiving," "authenticating," "refraining," "identifying," "specifying," "granting," "accessing," "assigning," "executing," "detecting," and "requesting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may be a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The descriptions and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the disclosure is not described with reference to any particular programming language. It will be appreciated that a variety of programming languages may be used to implement the teachings of the disclosure as described herein.

It is to be understood that the above description is intended to be illustrative, and not restrictive. Many other examples will be apparent to those of skill in the art upon reading and understanding the above description. Although the disclosure has been described with reference to specific examples, it will be recognized that the disclosure is not limited to the examples described, but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A method comprising:
receiving a first stack trace and a second stack trace;
recognizing a frame in the first stack trace comprising a blank entry for a function name;
in response to recognizing the frame in the first stack trace, determining a function name for the blank entry in the first stack trace by comparing one or more neighboring frames of the blank entry to one or more neighboring frames of a frame having an identified function name in the second stack trace;
in response to determining the function name, replacing the blank entry in the first stack trace with the identified function name in the second stack trace;
after replacing the blank entry, normalizing by a processing device, the first stack trace;
subsequent to the normalizing, determining that the first stack trace comprises a particular function name;
examining mapping data to determine a generic function name for the particular function name;
replacing the particular function name in the first stack trace with the generic function name from the mapping data;
subsequent to the replacing of the particular function name, determining, by the processing device, a distance between the normalized first stack trace and the second stack trace;
determining that the normalized first stack trace and the second stack trace are equivalent in view of the determined distance;
creating a single cluster of stack traces comprising the first stack trace and the second stack trace responsive to a determination that the first stack trace and the second stack trace are equivalent;
creating individual clusters of stack traces each comprising the first stack trace or the second stack trace responsive to a determination that the first stack trace and the second stack trace are not equivalent;
associating the created clusters of stack traces with a defect; and
communicating information about the associated created clusters for further analysis by an application developer.

2. The method of claim 1, further comprising:
sending a communication to a user indicating similarities among the first stack trace and the second stack trace.

3. The method of claim 1, further comprising:
establishing a stack trace cluster group size limit for the stack trace cluster;
receiving a plurality of additional stack traces;
normalizing each of the plurality of the additional stack traces;
determining, by the processing device, a distance between the normalized first stack trace and each of the plurality of normalized the additional stack traces;
determining whether each of the normalized additional stack traces and the first stack trace are equivalent in view of the respective distance; and
associating each of the plurality of additional stack traces with the cluster when a number of associated additional stack traces with the stack trace cluster is less than or equal to the stack trace cluster group size limit.

4. The method of claim 1, wherein the identified function name in the second stack trace is in a same position in the second stack trace as a position of the blank entry in the first stack trace.

5. The method of claim 1, further comprising:
determining that the first stack trace includes a distinguished function name; and
removing function names that precede the distinguished function name.

6. The method of claim 1, further comprising:
determining a number of process names to include in reverse chronological order; and
removing process names in excess of the number of process names.

7. An apparatus comprising:
a memory; and
a processing device, operatively coupled to the memory, to:
receive a first stack trace and a second stack trace;
recognize a frame in the first stack trace comprising a blank entry for a function name;
in response to recognizing the frame in the first stack trace, determine a function name for the blank entry in the first stack trace by comparing one or more neighboring frames of the blank entry to one or more neighboring frames of a frame having an identified function name in the second stack trace;
in response to determining the function name, replace the blank entry in the first stack trace with the identified function name in the second stack trace;
after replacing the blank entry, normalize the first stack trace;
subsequent to the normalizing, determine that the first stack trace comprises a particular function name;
examine mapping data to determine a generic function name for the particular function name;
replace the particular function name in the first stack trace with the generic function name from the mapping data;

subsequent to the replacing of the particular function name, determine a distance between the first stack trace and the second stack trace;
determine that the first stack trace and the second stack trace are equivalent in view of the distance;
create a single cluster of stack traces comprising the first stack trace and the second stack trace responsive to a determination that the first stack trace and the second stack trace are equivalent;
create individual clusters of stack traces each comprising the first stack trace or the second stack trace responsive to a determination that the first stack trace and the second stack trace are not equivalent
associate the created cluster of stack traces with a defect; and
communicate information about the associated created clusters for further analysis by an application developer.

8. The apparatus of claim 7, wherein the processing device is further to:
send a communication to a user indicating similarities among the first stack trace and the second stack trace.

9. The apparatus of claim 7, wherein the identified function name in the second stack trace is in a same position in the second stack trace as a position of a blank entry in the first stack trace.

10. The apparatus of claim 7, wherein the processing device is further to:
determine that the first stack trace includes a distinguished function name; and
remove function names that precede the distinguished function name.

11. The apparatus of claim 7, wherein the processing device is further to:
determine a number of process names to include in reverse chronological order; and
remove process names in excess of the number of process names.

12. The apparatus of claim 11, wherein the determined number is between 1 and 20.

13. A non-transitory computer readable storage medium including instructions that, when executed by a processing device, cause the processing device to:
receive a first stack trace and a second stack trace;
recognize a frame in the first stack trace comprising a blank entry for a function name;
in response to recognizing the frame in the first stack trace, determine a function name for the blank entry in the first stack trace by comparing one or more neighboring frames of the blank entry to one or more neighboring frames of a frame having an identified function name in the second stack trace;
in response to determining the function name, replace the blank entry in the first stack trace with the identified function name in the second stack trace;
after replacing the blank entry, normalize the first stack trace;
subsequent to the normalizing, determine that the first stack trace comprises a particular function name;
examine mapping data to determine a generic function name for the particular function name;
replace the particular function name in the first stack trace with the generic function name from the mapping data;
subsequent to the replacing of the particular function name, determine, by the processing device, a distance between the first stack trace and the second stack traces;
determine that the first stack trace and the second stack trace are equivalent in view of the distance;
create a single cluster of stack traces comprising the first stack trace and the second stack trace responsive to a determination that the first stack trace and the second stack trace are equivalent;
create individual clusters of stack traces each comprising the first stack trace or the second stack trace responsive to a determination that the first stack trace and the second stack trace are not equivalent;
associate the created cluster of stack traces with a defect; and
communicate information about the associated created clusters for further analysis by an application developer.

14. The non-transitory computer readable storage medium of claim 13, wherein the processing device is further to:
send a communication to a user indicating similarities among the first stack trace and the second stack trace.

15. The non-transitory computer readable storage medium of claim 13, wherein the processing device is further to:
determine that the first stack trace includes a superfluous name; and
remove the superfluous name.

16. The non-transitory computer readable storage medium of claim 13, wherein the processing device is further to:
determine that the first stack trace includes a distinguished function name; and
remove function names that precede the distinguished function name.

17. The non-transitory computer readable storage medium of claim 13, wherein the processing device is further to:
determine a number of process names to include in reverse chronological order; and
remove process names in excess of the number of process names.

* * * * *